United States Patent [19]

Lange et al.

[11] Patent Number: 5,371,130

[45] Date of Patent: Dec. 6, 1994

[54] POLYMER COMPOSITIONS OF IMPROVED COMPATIBILITY IN OIL

[75] Inventors: Richard M. Lange, Euclid; Curtis R. Scharf, Wickliffe, both of Ohio

[73] Assignee: The Lubrizol Corporation, Wickliffe, Ohio

[21] Appl. No.: 133,540

[22] Filed: Oct. 7, 1993

[51] Int. Cl.$^5$ .............................................. C08K 5/13
[52] U.S. Cl. ........................ 524/342; 252/52 R; 524/476; 524/485; 524/490; 524/491
[58] Field of Search .................. 525/384, 179, 181; 524/476, 485, 490, 491, 342; 252/52 R

[56] References Cited

U.S. PATENT DOCUMENTS

| | | | |
|---|---|---|---|
| 2,801,980 | 8/1957 | Spacht | 524/343 |
| 3,143,513 | 8/1964 | Day et al. | 252/51.5 |
| 3,855,135 | 12/1974 | Newingham et al. | 252/56 |
| 3,933,761 | 1/1976 | Coleman | 260/78.5 |
| 4,028,340 | 6/1977 | Kanezaki | 528/497 |
| 4,036,768 | 7/1977 | Crawford et al. | 252/51.5 |
| 4,221,700 | 9/1980 | Minagawa et al. | 524/342 |
| 4,546,137 | 10/1985 | Rossi et al. | 524/217 |
| 4,594,378 | 6/1986 | Tipton et al. | 524/106 |
| 4,684,711 | 8/1987 | Sakai et al. | 525/384 |
| 4,707,285 | 11/1987 | Brewster et al. | 252/58 |

FOREIGN PATENT DOCUMENTS

| | | |
|---|---|---|
| 744860 | 7/1970 | Belgium . |
| 42-3190 | 2/1967 | Japan . |
| 51-92890 | 8/1976 | Japan . |

*Primary Examiner*—Veronica P. Hoke
*Attorney, Agent, or Firm*—David M. Shold; Frederick D. Hunter

[57] ABSTRACT

A composition of an oil-soluble, olefin-based polymer and an oil-soluble polar polymer having nitrogen functionality, wherein the polymers in combination in oil exhibit incompatibility as evidenced by phase separation, shows improved compatibility by addition to the mixture of certain hydrocarbyl substituted hydroxyaromatic materials.

41 Claims, No Drawings

POLYMER COMPOSITIONS OF IMPROVED COMPATIBILITY IN OIL

BACKGROUND OF THE INVENTION

The present invention relates to a process and composition for improved mutual compatibility of olefin-based polymers and polar polymers having nitrogen functionality, in oil.

A variety of polymeric and oligomeric additives are sometimes added to lubricating oil compositions and concentrates in order to improve the performance properties of the oil. One class of such compounds is olefin-based polymers, which are often used as viscosity modifiers. Another class of such compounds is polar, nitrogen-containing polymers, which likewise are often used as viscosity modifiers, and which further can be used to impart dispersant performance to an additive packages. Materials from each of these classes normally exhibit a reasonable degree of solubility in oil or in similar hydrocarbon solvents. That is to say, individually members of each class of compound can normally be dissolved in oil in a sufficient quantity to provide a concentrate for later dilution to prepare a fully formulated lubricant.

However, it is often observed that these classes of additives cannot be satisfactorily used together, particularly in a concentrate. For reasons which are not fully understood, concentrates which contain both oil-soluble, olefin-based polymers and oil-soluble polar polymers having nitrogen functionality often undergo a physical or chemical interaction which leads to incompatibility between the species as evidenced by phase separation. Phase separation, as used in this application, is to be interpreted broadly and can be evidenced by the development of haziness upon mixing of two otherwise transparent solutions or by the failure of a mixture of polymers of the two types to form a clear solution when mixed in oil. In severe cases the phase separation can be evidenced by the gross physical separation of the mixture into two or more phases of liquids, solids, or semi-solids.

Such phase separation is almost always undesirable. Concentrates which exhibit severe phase separation may require stirring or heating in order to restore gross uniformity and to permit the concentrate to be effectively used. Even minor instances of phase separation are undesirable to the extent that they detract from the appearance and marketability of the concentrates. This incompatibility is most often a problem at temperatures of $-18°$ to $+65°$ C., which represents in many cases the range of temperatures at which concentrates of such additives are shipped or stored. The present invention provides a way to avoid such problems of incompatibility among otherwise oil-soluble polymeric additives.

U.S. Pat. No. 4,594,378, Tipton, Jun. 10, 1986, discloses a mixture of an oil-soluble polymer which is a homopolymer of a non-aromatic monoolefin or a copolymer thereof with an aromatic monoolefin, a nitrogen-containing ester of a carboxyl-containing interpolymer, and a viscosity-reducing liquid organic diluent such as a naphthenic oil or an alkylated aromatic material. Examples of such oils include benzenes substituted with hydrocarbon-based groups of about 8 to about 30 carbon atoms.

U.S. Pat. No. 4,546,137, Rossi et al., Oct. 8, 1985, discloses an additive combination for improving the cold flow properties of distillate fuels, comprising (a) an ethylene containing polymer, e.g. a copolymer of ethylene with vinyl acetate, (b) a hydrocarbon polymer, e.g. copolymers of ethylene and propylene or hydrocarbon polymers derivatised to contain polar groups (e.g. by grafting onto them maleic anhydride followed by amination), and (c) a polar oil soluble compound, which includes amides, salts, carboxylates, sulfonates, sulfates, phosphates, phenates, and borates, having hydrocarbon solubilizing groups; nitrogen compounds are particularly effective as component (c).

SUMMARY OF THE INVENTION

The present invention provides a composition comprising (a) at least one oil-soluble, olefin-based polymer; (b) at least one oil-soluble polar polymer having nitrogen functionality, wherein the polymers of (a) and (b) in combination in oil exhibit incompatibility as evidenced by phase separation; (c) at least one substituted hydroxyaromatic material, wherein the substitution comprises at least one hydrocarbyl group and contains in total at least about 24 carbon atoms; and (d) a nonpolar oleophilic medium.

The invention also provides a process for improving the mutual oil-solubility of the polymers (a) and (b), comprising the step of combining with a mixture of (a) and (b) in a non-polar oleophilic medium, an amount of (c) at least one hydrocarbyl-substituted hydroxyaromatic material wherein the substitution comprises at least one hydrocarbyl group and contains in total at least about 24 carbon atoms, sufficient to reduce said incompatibility.

DETAILED DESCRIPTION OF THE INVENTION

The first component of the composition of the present invention is at least one oil-soluble, olefin-based polymer other than polar polymers containing nitrogen functionality, which are the subject of the second component, discussed in greater detail below. The olefin-based polymers are generally oleophilic materials which are nonpolar in the sense of being substantially free from polar functional groups such as hydroxy groups or amino groups. Of course, all materials other than the simplest symmetrical molecules exhibit some measurable degree of polarity, but the present polymers will fall into the generally understood category of nonpolar polymers, normally having a dielectric constant of less than 3.

These materials are oil-soluble, which means, as above, that they can normally be dissolved in oil in a sufficient quantity to provide a concentrate for later dilution to prepare a fully formulated lubricant. The level of solubility of one particular polymer may differ from that of another, depending on structure, molecular weight, and other factors, but in general the present polymers have a level of solubility of at least 1 percent by weight, up to about 90 percent or more by weight, in mineral oil.

The present polymers are further described as olefin based materials, which means that the bulk of the polymer comprises polymerized olefin monomers. Olefin monomers include $\alpha$-olefins of 2 to 20 carbon atoms or more, preferably 2 to 12 or 2 to 8 carbon atoms, including ethylene, propylene, butene, pentene, hexene, octene, and isomers of such monomers. Olefin monomers also include olefins in which the double bond is not in an $\alpha$ position, but within a carbon chain or within a cyclic structure, although such monomers are often polymerized only with greater difficulty.

Olefin monomers include alkenyl substituted aromatic monomers. Such aromatic comonomer may have a single aromatic ring (benzene ring) or it may have fused or multiple aromatic rings. Examples of fused or multiple aromatic ring materials include alkenyl substituted naphthalenes, acenaphthenes, anthracenes, phenanthrenes, pyrenes, tetracenes, benzanthracenes, biphenyls, and the like. The aromatic comonomer may also contain one or more heteroatoms in the aromatic ring, provided that the comonomer substantially retains its aromatic properties and does not contribute excessive polarity to the polymer. Such heteroaromatic materials include alkenyl-substituted thiophene.

The nature of the alkenyl group of the alkenyl aromatic monomer is not particularly limited, provided that the alkenyl group provides an adequate means for incorporation of the alkenyl aromatic comonomer into the polymer chain. The alkenyl group is commonly a vinyl ($CH_2=CH-$) group; The most preferred alkenyl aromatic comonomer is styrene (vinyl benzene). While vinyl aromatic monomers can be formally classified as e-olefins, they are often considered to comprise their own class of monomers.

The alkenyl aromatic comonomer can be substituted either on the aromatic ring or on the alkenyl side chain. The nature of the substitution is not particularly limited, provided that such substitution does not destroy the substantially non-polar character of the polymer formed therefrom; substitution, if present, is preferably by a hydrocarbyl group.

Olefin monomers further include diene monomers. Dienes contain two double bonds, commonly located in conjugation in a 1,3 relationship. Olefins containing more than two double bonds, sometimes referred to as polyenes, are also considered to be included within the definition of "dienes" as used herein. Examples of such diene monomers include 1,3-butadiene and hydrocarbyl substituted butadienes such as isoprene and 2,3-dimethylbutadiene. Non-conjugated dienes such as norbornadiene are also available. These and numerous other monomers are well known and widely used as components of elastomers as well as modifying monomers for other polymers.

The olefin-based polymer can be an $\alpha$-olefin polymer or copolymer. These materials include polyethylene, ethylene/$\alpha$-olefin copolymers such as ethylene/propylene copolymers, ethylene/butylene copolymers, ethylene/hexene copolymers, and ethylene/octene copolymers, grades of polyethylene containing relatively more polar comonomers such as vinyl acetate (in sufficiently small amounts to not significantly change the nonpolar nature of the polymer), polypropylene and propylene copolymers, and polybutylene and butylene copolymers. Such materials can be considered plastics or elastomers depending on the proportions of the various comonomers present. The preparation of such $\alpha$-olefin polymers is well known and includes such processes as free radical polymerization and polymerization by coordination catalysis.

Such olefin polymers include not only direct copolymers, but also graft copolymers, that is, olefin polymers onto which minor amounts of polar vinyl monomers have been grafted. Such graft comonomers are sometimes used to impart dispersancy to the polymer. As long as the amount of comonomer, whether grafted or directly copolymerized, remains reasonably low, the polymer as a whole can be considered non-polar and may still exhibit incompatibility with the polar polymer (b).

Another class of olefin based polymers is vinyl aromatic/$\alpha$-olefin copolymers, including ethylene/styrene copolymers.

The olefin based polymer can also be a diene-containing polymer. Polybutadiene, polyisoprene, and the like, are well-known elastomers. Other diene-containing polymers include ethylene-propylene-diene polymers (where the diene can be, for instance, butadiene, isoprene, or other of the dienes described above) and vinyl aromatic/diene copolymers. Along the commonest of the latter copolymers are styrene/butadiene polymers, which can be random, block, or random block copolymers. Random copolymers are those in which the comonomers are randomly or nearly randomly arranged in the polymer chain; block copolymers are those in which one or more relatively long chains of one type of monomer are joined to one or more relatively long chains of another type; and random block copolymers are those in which relatively shorter chains of one type monomer alternate with similar chains of another type. Although the present invention can be employed satisfactorily with random, block, or random block styrene/butadiene polymers, it is more advantageously used with block copolymers, preferably di- or triblock polymers. That is, those polymers having relatively larger hydrocarbon segments (as opposed to the short chains characteristic of random block polymers) are more readily compatibilized by the present invention. Another type of suitable polymer is radial or "star" polymers. In all of the polymers discussed, third and higher comonomers can also be present, provided that the essential nature of the olefin-based polymer is not changed.

Olefin-based polymers which contain diene monomers generally retain a certain amount of unsaturation, since normally only one of the double bonds of the diene monomer will participate in the polymerization reaction. Often the residual unsaturation is removed by hydrogenating the polymer by known methods. The result is a partially or fully hydrogenated diene copolymer, examples of which include hydrogenated ethylene/propylene/diene polymers, hydrogenated styrene/diene block copolymers, hydrogenated styrene-diene random block copolymers, and hydrogenated styrene-diene copolymers (or random copolymers). Hydrogenated diene polymers generally exhibit somewhat better chemical stability than their non-hydrogenated counterparts.

The oil-soluble, olefin-based polymer component of the present compositions can be a single polymeric species or it can be a mixture of species. When a single species is present, it will preferably be a relatively low molecular weight polymer, having a weight average molecular weight below 10,000, preferably 600 to 5000 and more preferably 2000 to 5000. Such low molecular weight materials tend to exhibit better solubility in oils and are more readily made compatible with the oil-soluble polar polymers described below. One or more of these low molecular weight polymer may be present in the composition.

In one aspect of this invention there is present, in addition to the lower molecular weight olefin-based polymer, a higher molecular weight olefin-based polymer, having a weight average molecular weight greater than 50,000, for instance 100,000 to 250,000. The higher molecular weight polymer can be any of the aforementioned types, but is preferably a type similar to that of the particular lower molecular weight material. For example, a higher molecular weight styrene-diene block copolymer can be present in combination with a lower molecular weight styrene-diene block copolymer, or a high molecular weight EPDM (ethylene propylene diene) polymer can be present in combination with a low molecular weight polyisobutylene. Such mixtures of different molecular weight polymers are sometimes desirable to provide enhanced thickening performance and improved low temperature viscosity, while maintaining acceptable shear stability. If such a high molecular weight olefin polymer is present, it is preferably used in combination with a lower molecular weight polymer as described above. This is because many such high molecular weight polymers, alone, are relatively difficult to compatibilize in concentrates containing the oil-soluble polar polymers, and thus the benefits of the present invention may not be completely realized. The lower molecular weight polymer is thought in those instances to serve as an aid or co-agent for the higher molecular weight polymer. Thus a system containing (a) a low molecular weight oil-soluble olefin-based polymer along with (a') a high molecular weight polymer, (b) an oil-soluble polar polymer having nitrogen functionality, (c) a selected hydroxyaromatic material, and (d) an oil, can exhibit good compatibility where a mixture of (a'), (b), (c), and (d) may not.

If both low and high molecular weight olefin polymers are present, they should be present in such amounts that the low molecular weight material imparts improved compatibility with the high molecular weight material. This is a ratio which can be readily determined in each instance; but in general the ratios of low to high molecular weight material will be 10:1 to 500:1, preferably 50:1 to 200:1.

The second major component of the composition of the present invention (b) is at least one oil-soluble polar polymer having nitrogen functionality. These materials are first oil-soluble, which means, as above, that they can normally be dissolved in oil in a sufficient quantity to provide a concentrate for later dilution to prepare a fully formulated lubricant. The level of solubility of one particular polymer may differ from that of another, depending on structure, molecular weight, and other factors, but in general the present polymers have a level of solubility of at least 1 percent by weight, up to about 90 percent or more by weight, in mineral oil.

These polymers are designated as polar, by which is meant that they contain substantial amounts of polar functional groups such as heteroatoms which impart overall polar character to the polymer. Examples of functional groups which can impart polar character to a polymer include hydroxy, amino, keto, acid, ester, amide, imide, thio, mercapto, and phosphorus based groups. The polar functional groups will not be present in such large amounts, however, as to destroy the oil-solubility of the polymer. Suitable polymers commonly have dielectric constants of about 3 or greater.

Finally, this class of polymer is described as possessing nitrogen functionality, and preferably basic nitrogen functionality. While the presence of nitrogen functionality may impart a measure of polar character to the polymer, the characteristic of nitrogen functionality is considered for purposes of the present invention to be a separate attribute from that of polarity, discussed above. Suitable groups which impart nitrogen functionality include primary, secondary, and tertiary amine groups, amide groups, imide groups, cyano groups, quaternary ammonium groups, imidic acid groups, nitro groups, hydrazyl, azo, and diazo groups, pyridyl groups, pyrimidyl groups, pyrrole groups, and isomeric structures thereof.

The preferred nitrogen functionality is the basic nitrogen functionality which is imparted by one or more amine groups. The amine groups can be present in the polymer as a part of the chain, as in the case of a poly(alkyleneamine), or they can be present as pendant groups from the main carbon chain. Finally, they can be present in the polymer by virtue of reaction with a reactive site on the polymer, such as an acid or anhydride group, or equivalent, as described in more detail below. The amines can be polyamines, that is, amino compounds containing more than one nitrogen atom. Polyamines may be aliphatic, cycloaliphatic, heterocyclic or aromatic. Examples of the polyamines include alkylene polyamines, hydroxy containing polyamines, arylpolyamines, and heterocyclic polyamines. Alkylene polyamines are represented by the formula

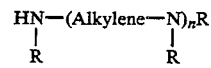

wherein n preferably has an average value from 1 or 2 to 10 or 7 or to 5, and the "Alkylene" group preferably has from 1 or 2 to 10 or 6 or 4 carbon atoms. Each R is independently hydrogen, or an aliphatic or hydroxy-substituted aliphatic group of up to about 30 carbon atoms. Such alkylenepolyamines include methylenepolyamines, ethylenepolyamines, butylenepolyamines, propylenepolyamines, pentylenepolyamines, etc. Ethylenepolyamine, also referred to as polyethyleneamine, is a preferred material. Such polyamines can be prepared by the reaction of ethylene dichloride with ammonia or by reaction of an ethylene imine with a ring opening reagent such as water, ammonia, etc. Suitable amines for such reaction also include N,N-dihydrocarbylalkanediamines and N-aminoalkyl nitrogen heterocycles. Specific amines of these types include N,N-dimethyl-1,3-propanediamine and N-(3-aminopropyl)morpholine (prepared by hydrogenation of the cyanoethylation product of morpholine and acrylonitrile, using a nickel catalyst).

Polymers which can react with amines to form nitrogen-containing polymers can generally be classified as polymers with (A) acidic or (B) neutral reactive comonomer functionality. By acidic functionality (A) is generally meant functionality derived from acids, such as carboxylic acids, including (as is customary) their anhydrides. Examples of acids which can serve as comonomers to impart acidic function are maleic, itaconic, citraconic, and fumaric acids or anhydrides (as applicable), alkyl hydrogen maleates, itaconates, citraconates, and fumarates, maleamidic and fumaramidic acids, acrylic and methacrylic acids, cinnamic acid, and crotonic acid. By neutral functionality (B) is generally meant esters, amides, and other non-acidic functionality which is nevertheless reactive with amines. Examples of comonomers which supply suitable neutral functionality include dialkyl maleates, fumarates, itaconates, and citraconates, alkyl acrylates and methacrylates, alkyl cinnamates, alkyl crotonates, and corresponding amides. If neutral functionality is used, preferably at least one ester group will be present in the polymer. Acid functionality in a polymer can react with amines to incorporate nitrogen functionality by direct amide formation with liberation of water (unless an anhydride is used). Neutral functionality in a polymer can react by e.g. amide-ester interchange, with liberation of the alcohol from the ester. For most effective incorporation of nitrogen functionality by this route, the polymer should not contain any appreciable amount of copolymerized vinyl esters: amide-ester interchange with vinyl esters would liberate a monomeric amide, leaving only a hydroxy group on the polymer chain.

An example of a class of polymers with acid or anhydride functionality suitable for reaction with the above amines is maleic anhydride-olefin copolymers and their equivalents. The anhydride can be in the form of acid, acyl chloride, ester, or other reactive moiety. Maleic acid (cis-butenedioic acid), its esters, or its anhydride can be incorporated into a polymer by direct copolymerization or by grafting onto a pre-formed polymer substrate. When polymerized or grafted, the ethylenic double bond of maleic acid is reduced to a single bond, so that the resulting monomer could also be described as a succinic acid derivative. Fumaric acid, the trans isomer of butenedioic acid, and its esters, are indistinguishable from maleic acid or its esters when incorporated into a polymer. Other useful derivatives of maleic acid include those with substitution of one or more hydrogen atoms on one or both of the ethylenic carbon atoms by alkyl groups; this type of derivative includes citraconic acid, which has one methyl substituent. A related material is itaconic acid, 2-methylenesuccinic acid. A preferred acid is maleic acid, or its anhydride.

The olefin comonomer which, together with maleic anhydride comonomer, forms a suitable polymer for reaction with amines can be any copolymerizable olefin comonomer. It is preferably an alkenyl substituted aromatic monomer, as has been defined above. The most preferred alkenyl substituted aromatic monomers are styrene and alkylated styrenes; the most preferred polymers are copolymers of these styrenes with maleic anhydride.

The molar ratio of the alkenyl substituted aromatic monomer to the maleic anhydride monomer or derivative thereof in the copolymer is normally about 5:1 to about 1:1.5. Preferably the copolymer contains these two comonomers in a ratio of about 1:1, particularly preferably in the substantial absence of third comonomer. This 1:1 mole ratio is preferred in part because maleic anhydride and styrene comonomers under certain reaction conditions copolymerize in about this ratio in a regularly alternating fashion. This regularly alternating 1:1 copolymer of maleic anhydride and styrene is a preferred copolymer for the present invention.

The regularly alternating 1:1 copolymer of maleic anhydride and styrene can be prepared by polymerizing equimolar amounts of maleic anhydride and styrene with stirring in a toluene medium under nitrogen. A free radical initiator is used; if benzoyl peroxide is selected, the polymerization reaction is run at 100° C. over a course of several hours.

While normally the polymeric material as just described will be a binary copolymer of maleic anhydride or a derivative thereof with an alkenyl-substituted aromatic comonomer, it is possible that one or more additional comonomers may be present. One class of such comonomers comprises those comonomers which impart branching or crosslinking to the polymer chain. Examples of comonomers suitable for this purpose include those comonomers which may themselves be alkenyl substituted aromatic materials, in particular, dialkenyl substituted aromatic materials such as divinylbenzene. These materials are normally less preferred, however, in as much as extensive branching or crosslinking can lead to gelation in solution, even at low levels of incorporation.

Still other comonomers may be introduced into these copolymers for various purposes, e.g. to modify the solubility, processing, chemical, or rheological properties of the polymer. Examples of such comonomers include acrylic acid, methacrylic acid, and alkyl acrylates and methacrylates. The most preferred third comonomers are alkyl acrylates and methacrylates and salts thereof. The amount of such third comonomer (which term includes fourth and higher comonomers), if any, is normally 0 to 20 mole percent of the copolymer, preferably 0 to 5 mole percent.

Amide-forming reactions, whether by direct reaction of an amine with an acid or anhydride, or by amide-ester interchange, are well known reactions within the ability of one of ordinary skill in the art. Such reactions are generally conducted by mixing the materials at elevated temperature, e.g. 140°-180° C., either in solution or in a melt, optionally in the presence of an acidic catalyst, with removal of the byproduct water or alcohol.

Nitrogen-containing polymer can also be prepared by polymerizing monomers with nitrogen functionality directly into a polymer chain, using known polymerization process such as free-radical polymerization. Suitable nitrogen-containing monomers include dialkylaminoethyl acrylates or methacrylates, dialkylaminoethyl acrylamides or methacrylamides, dialkylaminopropyl acrylamides or methacrylamides, dialkylamine-poly(oxyalkyl) acrylates or methacrylates, 2-vinylpyridine, 4-vinylpyridine, N-vinylpyrrolidone, N-vinylcarbazol, and 1-vinylimidazole. These monomers can also be present in a polymer which is to be further reacted with an amine as outlined above.

The third major component (c) of the composition of the present invention is at least one substituted hydroxy-aromatic material, wherein the substitution comprises at least one hydrocarbyl group and contains in total at least 24 carbon atoms. Hydroxy aromatic materials include phenols as well as naphthols and other hydroxy-substituted polynuclear aromatic hydrocarbons, including fused and bridged ring systems. The preferable materials are phenols. The phenols can have other substituent groups such as amino groups, additional hydroxy groups, nitro, halo, hydroxyalkyl, acyloxy, acyl, alkoxyalkyl, alkoxy, amido, and carboxamide groups. However, the hydroxy aromatic material should have at least one hydrocarbyl group. In order to provide optimum compatibilization properties, the hydrocarbyl group or groups should contain at least 24 carbon atoms in total. These carbon atoms can be located entirely in a single hydrocarbyl group of 24 or more carbon atoms, or they may be distributed over two or more hydrocarbyl groups. For instance, one hydrocarbyl group could have 18 carbon atoms and a second could have 6 or more carbon atoms. Preferably the hydrocarbyl groups contain a total of at least 30 carbon atoms. Preferably one hydrocarbyl group contains at least 24 and more preferably at least 30 or even at least 31 or 36 carbon atoms, or, as otherwise expressed, having a lower molecular weight of at least 340, preferably at least 400, and more preferably at least 430 or 500. It is further preferred that the hydrocarbyl group be an alkyl group, and further that it have a number average molecular weight of 400 to 2000 (which corresponds to 28-143 carbon atoms). Such materials will normally include molecules having alkyl groups of a variety of chain lengths; hence a number average molecular weight is normally used to describe them. Certain preferred materials include polybutenylphenols, and especially those in which the polybutenyl group has a number average molecular weight of 500 to 800 (which corresponds to 36 to 57 carbon atoms or 9 to 14 butene units).

Such hydrocarbyl substituted hydroxy aromatic materials are prepared by known techniques. The attachment of a hydrocarbyl group to the aromatic moiety can be accomplished, for instance, by the Friedel-Crafts reaction, wherein an olefin (e.g. a polymer containing an olefinic bond), or a halogenated or hydrohalogenated analog thereof, is reacted with a phenol in the presence of a Lewis acid catalyst. Methods and conditions for carrying out such reactions are well known to those skilled in the art and are discussed, for example, in the article entitled "Alkylation of Phenols" in "Kirk-Othmer Encyclopedia of Chemical Technology," Third Edition, Vol. 2, pages 65-66, Interscience publishers, a division of John Wiley and Company, New York. In an exemplary process, an alkylated phenol is prepared by reacting phenol with polybutene having a number average molecular weight of about 1,000 in the presence of a boron trifluoride/phenol catalyst. The catalyst is neutralized and removed by filtration. Stripping of the product filtrate at reduced pressure provides purified alkylated phenol as a residue.

The amount of the hydroxy aromatic material is that amount which is sufficient to provide improved compatibility between components (a), the olefin based polymer or polymers, and (b), the polar polymer having nitrogen functionality. Compatibility can be defined as the absence of phase separation, as described above; improved compatibility refers to reduction in the severity of phase separation or complete elimination of phase separation, as will be apparent upon observation by the person skilled in the art. Preferably the amount of component (c), the hydroxyaromatic material, will be 10 to 100% by weight of the total of components (a) (including (a') if any) and (b), and more preferably it will be 25 to 50% by weight of that total.

The relative amount of components (a) and (b) and their concentrations in oil are those amounts at which there is evidence of incompatibility under conditions of actual use, for example, extended storage or shipment at some temperature in the range of −18° to +65° C. Most often components (a) and (b) will be present in a weight ratio (a):(b) of 15:1 to 1:1, and particularly a weight ratio of 10:1 to 1.5:1.

The present invention is most useful when components (a) and (b) are present in relatively high concentrations, as in a concentrate. Concentrates are solutions or dispersions of materials in an oil or in another medium which is compatible with the end use of the substance. They are widely used to aid in handling of solids or otherwise difficult materials and are designed to be added to e.g. lubricating oil to form a final lubricant composition. Normally for the present invention the medium of the concentrate (d) is itself an oil of lubricating viscosity as defined below, and it is preferably a mineral oil. The invention can also be effective when used with another nonpolar oleophilic medium such as a hydrocarbon solvent.

Suitable oils of component (d) of the present invention include natural or synthetic lubricating oils and mixtures thereof in which components (a) and (b) of the present invention exhibit mutual incompatibility which is alleviated by the present invention. Suitable oils are generally hydrocarbon oils of low polarity, such as mineral oils of paraffinic, naphthenic, or mixed types; solvent or acid treated mineral oils; and oils derived from coal or shale. Certain vegetable oils, which have higher polarity, are unsuitable. Synthetic lubricating oils based on esters would normally be expected to be too polar to fully exhibit the advantages of the present invention, while others, of lower polarity, may be suitable. Other synthetic lubricating oils of lower polarity would be suitable; such materials include synthetic hydrocarbon oils and alkyl aromatic oils. Other materials, including halogen-substituted hydrocarbon oils, alkylene oxide polymers (including those made by polymerization or copolymerization of $C_2$ to $C_{18}$ alkylene oxides such as ethylene oxide or propylene oxide), can also be suitable, although they may be less frequently employed in commercial practice. Silicon-based oils (including siloxane oils and silicate oils) are generally unsuitable. Included among the suitable oils are unrefined, refined, and rerefined oils. In general suitable oils will have a dielectric constant of less than about 3. Mineral oil is especially preferred.

Other materials of suitable low polarity for use as the nonpolar oleophilic medium include hydrocarbon solvents, in particular aliphatic hydrocarbons such as hexane, cyclohexane, octanes, and the like. Such materials, however, may be less preferred for commercial use because of their volatility.

The amount of oil or other oleophilic medium in the composition is normally 10 to 50 weight percent of the total composition, preferably 15 to 40 weight percent, and most preferably 20 to 30 weight percent. However, larger amounts can still be effectively used, particularly if one or more of the components exhibits more limited solubility in the medium. Effective amounts correspond generally to concentrations found when oil is used as a component in a concentrate.

The compositions of the present invention can include one or more further optional components which are commonly used in lubricants, including antioxidants, corrosion inhibitors, and pour point depressants. Such additives can be conveniently made a part of a concentrate of the present invention in order to provide for their facile incorporation into a fully formulated lubricant. The lubricant can then benefit from the presence of the additives for their antioxidant, corrosion inhibition, pour point depression, or other pertinent properties.

The exact degree of improvement in compatibility in compositions of the present invention will depend on a variety of factors. The relative amounts and chemical identities of the species will be important. In addition, the mixing or storage conditions can also play a role. Substances in general tend to be more compatible at higher temperatures, for example. Molecular weight and degree of branching of the polymers may also play a role. It is also believed that the presence of third bodies, such as metal surfaces of steel storage containers, can lead to reduced compatibility or phase separation. But under a variety of such conditions the presence of the hydrocarbyl-substituted hydroxyaromatic material will provide improved compatibility compared to a corresponding composition without that additive.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Such groups include hydrocarbon groups, substituted hydrocarbon groups, and hetero groups, that is, groups which, while primarily hydrocarbon in character, contain atoms other than carbon present in a chain or ring otherwise composed of carbon atoms.

EXAMPLES

Example 1 (comparative). A mixture is prepared of (a) 75 parts by weight polyisobutene, 1700 number average molecular weight, and (b) 25 parts by weight of a composition of a 1:1 alternating maleic anhydride/styrene copolymer, 100,000 weight average molecular weight, 100 parts of which are esterified with a mixture of 109 parts of 12-18 carbon atom length primary alcohols, 73 parts of 8-10 carbon atom length primary alcohols, and 7.4 parts of n-butyl alcohol, to about 95% conversion, followed by neutralization and reaction with 7.2 parts of 4-(3-amino-propyl)morpholine to give a nitrogen content of 0.44 percent by weight (oil free basis). The component (b) contains about 45% polymeric material (i.e. accounting for about 11.25 parts by weight) and about 55% hydro-treated 100 neutral diluent oil (i.e. about 13.75 parts by weight). The mixture is prepared by adding the polyisobutylene followed by the nitrogen-containing maleic anhydridestyrene ester polymer to a blending container, gradually heating the materials to 80° C. under constant mechanical stirring, holding at 80° C. until the system is homogeneous. The mixture initially has a hazy appearance; upon standing for one to two days, the mixture separates into two distinct layers.

Example 2 (comparative). Components (a) and (b), as in Example 1, are combined in equal amounts, component (b) containing, as in Example 1, 55% oil. The mixture separates upon standing for two days, as in Example 1.

Example 3. A mixture is prepared of 30 parts by weight component (a) and 50 parts component (b), as in Example 1, along with (c) an additional 20 parts by weight of polyisobutylene (940 number average molecular weight) substituted phenol (95-100% chemical, balance residual polyisobutylene). The resulting mixture is amber, slightly hazy and slightly grainy. No change in appearance is detected after allowing the mixture to stand for 2 weeks at room temperature.

Example 4. Example 3 is repeated, using 70 parts of component (a), 20 parts of component (b), and 10 parts of component (c). The resulting mixture is amber, hazy and slightly grainy. No change in appearance is detected after allowing the mixture to stand for 2 weeks at room temperature.

Example 5. Example 3 is repeated, using 65 parts of component (a), 15 parts of component (b), and 20 parts of component (c). The resulting mixture is amber with a trace of haze and a smooth appearance. No change in appearance is detected after allowing the mixture to stand for 2 weeks at room temperature.

Example 6. (comparative) A mixture is prepared as in Example 1, of (a) 90 parts by weight polyisobutylene, 1700 number average molecular weight, containing 90 percent polymer and 10 percent diluent oil, (b) 22 parts by weight of a composition of a 1:1 alternating maleic anhydride/styrene copolymer, 150,000 weight average molecular weight, 100 parts of which are esterified with a mixture of 138 parts of 12-18 carbon primary alcohols and 26.6 parts of n-butyl alcohol to 95% conversion, followed by neutralization or reaction with 7.5 parts of 4-(3-aminopropyl)morpholine to give a nitrogen content of 0.4% by weight (oil-free basis). Component (b) contains 35 percent polymeric material (accounting for 7.7 parts by weight) and 65 percent hydrotreated 100 neutral diluent oil. The mixture also contains 4 parts of an additive package of 55% polymethacrylic ester pour point depressant and 45% oil. The resulting mixture is hazy and granular in appearance. When the composition is diluted by mixing it with an equal weight of 100 Neutral base oil from Exxon, the mixture is hazy.

Example 7. Example 6 is repeated except that in addition, 20 parts by weight of the polyisobutylene substituted phenol (c) of Example 3 is included. The resulting mixture is clear, having only a trace of granular appearance, with no further change in appearance upon standing for 2 weeks at room temperature. When the composition is diluted as in Example 6, the resulting mixture is clear.

Example 8. Example 7 is repeated except that the amount of component (a) is reduced to 70 parts by weight. The resulting mixture is clear, with a smooth appearance (no change after 2 weeks), and leads to a clear mixture upon dilution as in Example 6.

Example 9. Example 8 is repeated except that the amount of component (b) is increased to 30 parts by weight. The resulting mixture is clear, with a smooth appearance (no change after 2 weeks), and leads to a clear mixture upon dilution as in Example 6.

Example 10. Example 8 is repeated, except that in addition 5 parts by weight of a high molecular weight (200,000 weight average) hydrocarbon (EPDM) polymer solution is added. The added solution is 10% polymer in 90% 100 neutral diluent oil. The concentrate formed is clear, with a smooth appearance, and leads to a clear mixture upon dilution as in Example 6.

Example 11-15. Example 7 is repeated except that in addition 15 parts by weight of a high molecular weight polymer solution (in 100 neutral diluent oil) is added. The identity of each added polymer and the results are shown below:

- Ex. 11: The polymer of Example 10; the concentrate formed is clear, with a smooth appearance, and leads to a clear mixture upon dilution as in Example 6.
- Ex. 12: A hydrogenated random block copolymer of styrene and butadiene, weight average molecular weight 220,000, about 8% polymer solution; the concentrate formed is very hazy and granular in appearance.
- Ex. 13: A hydrogenated diblock copolymer of styrene and isoprene, weight average molecular weight 200,000, about 6% polymer solution; the concentrate formed is clear, with a smooth appearance, and leads to a clear mixture upon dilution as in Example 6.
- Ex. 14: A hydrogenated random block copolymer of styrene and butadiene, weight average molecular weight 130,000, about 8% polymer solution; the concentrate formed is hazy.
- Ex. 15: A hydrogenated diblock polymer of styrene and isoprene, weight average molecular weight 140,000, about 10% polymer solution; the concentrate formed has a very slight haze, with a smooth appearance, and leads to a clear mixture upon dilution as in Example 6.

Examples 16-29. The following examples were prepared by blending 16.1 parts by weight of a polyisobutylene (940 number average molecular weight) substituted phenol, which contains 10% diluent oil, with an amount, indicated in parts by weight in Table 1 below, of an esterified alternating maleic anhydride styrene copolymer. (This is, as indicated in Table 1, the ester copolymer defined in Example 6, the ester copolymer defined in Example 1, or one similar to that in Example 1, except that it is esterified with 139 parts of the $C_{12}$–$C_{18}$ alcohols, 25 parts of the $C_8$–$C_{10}$ alcohols, and 14.8 parts of n-butyl alcohol.) The ingredients are mixed for 60°–70° C. for 1 hour. Thereafter 0.8 parts of a first polymethacrylate ester pour point depressant ("Acryloid TM 150," comprising 40% chemical and 60% diluent oil) and 2.0 parts of a second polymethacrylate ester pour point depressant ("Acryloid TM 156," comprising 60% chemical and 40% diluent oil) are blended in. The mixture is stirred at 60°–70° C. until it is homogeneous. Finally, an amount (indicated in Table 1) of polyisobutylene, 1700 number average molecular weight, containing 10% diluent oil, is added. The entire mixture is stirred at 60°–70° C. for 1 hour. Thereafter portions of each mixture are stored in the presence of steel for four weeks at room temperature and, in a separate, more severe test at 65° C., and then observed for separation of components. In Table 1 the results at 4 weeks and at 26 weeks are noted: "C" indicates the mixture remains compatible; "S" indicates that the mixture shows signs of separation. Results are reported for both temperatures.

TABLE 1

| Ex. | Polyisobutylene | Ester of Ex. 6 | Ester sim. to Ex. 1 | Ester of Ex. 1 | Results (RT/65°) 4 weeks | 26 weeks |
|---|---|---|---|---|---|---|
| 16 | 56.50 | — | 24.60 | — | C/C | C/C |
| 17 | 50.35 | — | 30.75 | — | C/S$^a$ | C/C |
| 18 | 62.65 | — | 18.45 | — | C/C$^b$ | C/C |
| 19 | 44.20 | — | 36.90 | — | C/C | C/C |
| 20 | 68.80 | — | 12.30 | — | C/C | C/C |
| 21 | 56.50 | 24.60 | — | — | C/S | C/nd |
| 22 | 50.35 | 30.75 | — | — | C/S | C/nd |
| 23 | 62.65 | 18.45 | — | — | C/S | C/nd |
| 24 | 44.20 | 36.90 | — | — | C/S | C/nd |
| 25 | 68.80 | 12.30 | — | — | C/C | C/C |
| 26 | 32.9 | 49.0 | — | — | C/C | C/C |
| 27 | 32.9 | — | — | 49.0 | C/S | S/S |
| 28 | 44.3 | 36.8 | — | — | C/S | C/S |
| 29 | 44.3 | — | — | 36.8 | S/S | S/S |

$^a$Questionable observation.
$^b$Some sediment observed, perhaps due to contamination.
nd – not determined Examples 30–41. The procedure of Example 15-29 is substantially repeated, except that in place of the two polymethacrylate pour point depressants used, 3 parts by weight of a single material which may function as a pour point depressant in the concentrate is present. This material is either the Acryloid TM 150, referred to above (designated as "A" in Table 2), a polymethacrylate ester/decene oligomer synthetic oil ("RohmTech Viscobase" TM, designated as "B" in Table 2) or another polymethacrylate pour point depressant ("Viscoplex TM 1-330"), 50% chemical and 50% diluent oil (designated as "C" in Table 2). The results are as indicated:

TABLE 2

| Ex. | Polyisobutylene | Ester of Ex. 6 | Ester sim. to Ex. 1 | other mat'l | Results (RT/65°) 4 weeks | 26 weeks |
|---|---|---|---|---|---|---|
| 30 | 56.30 | 24.60 | — | A | C/C | C/C |
| 31 | 56.30 | 24.60 | — | B | C/S | C/S |
| 32 | 56.30 | 24.60 | — | C | C/S | C/S |
| 33 | 50.15 | 30.75 | — | A | C/C | C/C |
| 34 | 50.15 | 30.75 | — | B | C/S | C/S |
| 35 | 50.15 | 30.75 | — | C | C/S | C/S |
| 36 | 62.45 | 18.45 | — | A | C/C | C/C |
| 37 | 62.45 | 18.45 | — | B | C/S | C/S |
| 38 | 62.45 | 18.45 | — | C | C/S | C/S |
| 39 | 56.30 | — | 24.60 | A | C/S | S/S |
| 40 | 56.30 | — | 24.60 | B | C$^b$/S | S/S |
| 41 | 56.30 | — | 24.60 | C | C/S | S/S |

$^b$Sample became hazy.

Examples 42–50. The procedure of Examples 30–41 is substantially repeated except that in place of the alkylphenol was used an alkylaminophenol, prepared by nitrating and reducing the alkylphenol of Examples 16–29. The alkylated aminophenol product is present as a mixture which contains 40% diluent oil; 16.10 parts by weight of this oil-containing material is used. In some examples the mixture of 0.8 parts Acryloid TM 150 and 2.0 parts Acryloid TM 156 were used; this mixture of pour point depressants is designated in the following as "M." Samples were observed after storage at room temperature or 65° C. at times up to 26 weeks, as indicated in Table 3:

TABLE 3

| Ex. | Polyisobutylene | Ester of Ex. 6 | Ester of Ex. 1 | other mat'l | Results (RT/65°) 3, 4, | 26 weeks |
|---|---|---|---|---|---|---|
| 42 | 62.55 | 18.45 | — | M | — | C/C | S/S |
| 43 | 56.50 | 24.60 | — | M | — | C$^a$/C | S/S |
| 44 | 50.35 | 30.75 | — | M | C/C | S/C | S/S |
| 45 | 44.30 | 36.80 | — | M | C/C | S/C | S/S |
| 46 | 32.90 | 49.00 | — | M | — | C$^a$/C | S/S |
| 47 | 56.50 | — | 24.60 | M | S$^b$/C | S/C | S/S |
| 48 | 56.30 | 24.60 | — | A | — | C$^a$/C | C/Gel |
| 49 | 56.30 | 24.60 | — | B | C/C | C/C | C/C |
| 50 | 56.30 | 24.60 | — | C | C$^a$/C | C/C | C/C |

$^a$Slight haze
$^b$Sample was clear at 2 weeks

Example 51. A mixture is prepared by mixing and heating, under conditions set forth in Example 1, (a) 100 parts by weight of an ethylene/1-octene copolymer, containing 2 mole percent 1-octene and having a number average molecular weight of about 8,000, (b) 30 parts by weight of a copolymer of mixed lower alkyl acrylates ($C_1$–$C_{18}$, predominantly $C_{12}$–$C_{18}$ alkyl), 5 mole percent of said acrylate groups thereof having been converted to amide groups by reaction with N,N-diethylpropane-1,3-diamine to form an amide-containing polymer, (c) 52 parts of mixed cresols alkylated with a polyisobutenyl chain having a number average molecular weight of about 2000, the mixture of substituted cresols being 25% by weight (giving 13 parts) active material and the remainder (giving 39 parts) diluent mineral oil. The mixture is cooled to room temperature with stirring, and 104 parts is added of an α-olefin oligomer, 4–6 cSt, prepared from 1-decene, to form a concentrate.

Example 52. A mixture is prepared by mixing and heating, under conditions set forth in Example 1, (a) 100 parts by weight of polypropylene, number average molecular weight 1000, (b) 30 parts by weight of a copolymer of 50 mole percent $C_4$ to $C_{18}$ alkyl esters of maleic acid, 43 mole percent vinyl acetate, and 7 mole percent of 2(N,N-dimethylamino)ethyl methacrylate, and (c) 130 parts by weight of an octapropylene-substituted phenol, the substituted phenol being 78% by weight (101 parts) active material and the remainder (29 parts) diluent mineral oil.

Example 53. Example 3 is repeated except that the polyisobutylene substituted phenol is replaced by a similar material in which the polyisobutylene group has a number average molecular weight of 400.

Examples 54–81. Blends of the materials shown in Table 4 are prepared by mixing at 110°–120° C., then cooling to room temperature. The materials are allowed to stand overnight and then examined for evidence of separation. The amounts of components shown in Table 4 are adjusted to reflect the amount of active chemical; the balance of material to total 100% is diluent oil (mineral oil) initially present in some or all of the individual components. For each example the hydrocarbon polymer ("HC Pol.") is as indicated: "PBU" is the polyisobutene of 1000 number average molecular weight; "PP" is polypropylene of weight average molecular weight 1024; "EPD" is EPDM ethylenepropylene-diene rubber, as in Ex. 10, from DuPont; "SDD" is a hydrogenated styrene diene diblock copolymer (Shellvis 40 ™); "SDR" is a hydrogenated styrene diene random block copolymer, as in Ex. 14, from BASF. The nitrogen-containing polymer ("N pol.") is that of Example 1 (designated E1) or that of Example 6 (designated E6). In each case the substituted phenol is phenol alkylated with a 1000 mw polyisobutenyl chain ("phenol").

TABLE 4

| Ex. | HC pol. type, % | N pol. type, % | HC-phenol % | Appearance |
|---|---|---|---|---|
| 54 | PBU 55 | E6 15.3 | 0 | sharp separation |
| 55 | PBU 50 | E6 13.6 | 10 | diffuse separation |
| 56 | PBU 44 | E6 12.2 | 20 | clear - no separation |
| 57 | PP 50 | E6 17.0 | 0 | hazy - no clear separation |
| 58 | PP 45 | E6 15.3 | 10 | clear - no separation |
| 59 | PP 40 | E6 13.6 | 20 | clear - no separation |
| 60 | EPD 5.0 | E6 17.0 | 0 | diffuse separation |
| 61 | EPD 4.5 | E6 15.3 | 10 | diffuse separation |
| 62 | EPD 4.0 | E6 13.6 | 20 | hazy separation |
| 63 | EPD 3.0 | E6 17.0 | 20 | hazy (no separation) |
| 64 | SDD 3.0 | E6 17.0 | 0 | hazy separation |
| 65 | SDD 2.7 | E6 15.3 | 10 | slight haze (some separation but diffuse) |
| 66 | SDD 2.4 | E6 13.6 | 20 | very slight hazy |
| 67 | SDD 1.8 | E6 17.0 | 20 | very slight hazy |
| 68 | SDR 4.8 | E6 13.6 | 0 | separated |
| 69 | SDR 4.0 | E6 10.2 | 20 | slight haze |
| 70 | SDR 2.4 | E6 17.0 | 20 | haze |
| 71 | PP 55 | E1 18.4 | 0 | hazy; separates |
| 72 | PP 50 | E1 16.4 | 10 | clear |
| 73 | PP 44 | E1 14.8 | 20 | clear |
| 74 | PBU 55 | E1 18.4 | 0 | hazy, diffuse, separation |
| 75 | PBU 50 | E1 16.4 | 10 | hazy, diffuse, separation |
| 76 | PBU 44 | E1 14.8 | 20 | clear |
| 77 | PBU 44 +PP 10 | E1 14.8 | 10 | separates |
| 78 | EPD 5 | E1 20.5 | 0 | hazy, separation |
| 79 | EPD 4 | E1 16.4 | 20 | hazy, diffuse/separation |
| 80 | EPD 3 | E1 20.5 | 20 | hazy, diffuse/separation |
| 81 | PP 50 | E1 20.5 | 0 | separation |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. As used herein, the expression "consisting essentially of" permits the inclusion of substances which do not materially affect the basic and novel characteristics of the composition under consideration.

What is claimed is:

1. A composition comprising:
   (a) at least one oil-soluble, olefin-based polymer;
   (b) at least one oil-soluble polymer having nitrogen functionality, wherein the polymers of (a) and (b) in combination in a liquid nonpolar oleophilic medium exhibit incompatibility as evidenced by phase separation;
   (c) at least one substituted hydroxyaromatic material, wherein the substitution comprises at least one hydroxycarbyl group and contains in total at least about 24 carbon atoms, said material being present in an amount sufficient to reduce the incompatibility of components (a) and (b) in the composition; and
   (d) a liquid nonpolar oleophilic medium.

2. The composition of claim 1 wherein the nonpolar oleophilic medium is a liquid with a dielectric constant of less than about 3.

3. The composition of claim i wherein the nonpolar oleophilic medium is at least one member selected from the group consisting of mineral oils of paraffinic, naphthenic, or mixed types, oils derived from coal or shale, synthetic hydrocarbon oils, and alkyl aromatic oils.

4. The composition of claim 1 wherein the nonpolar oleophilic medium (d) is present in a concentrate-forming amount.

5. The composition of claim 1 wherein the nonpolar oleophilic medium (d) comprises about 10 to about 50 percent by weight of the composition.

6. The composition of claim 1 wherein the nonpolar oleophilic medium (d) comprises about 20 to about 30 percent by weight of the composition.

7. The composition of claim 1 wherein the nonpolar oleophilic medium (d) is an oil.

8. The composition of claim 7 wherein the oil is mineral oil.

9. The composition of claim I wherein the oil-soluble olefin-based polymer (a) is an α-olefin polymer, a vinyl aromatic/α-olefin copolymer, a hydrogenated diene polymer, or a hydrogenated vinyl aromatic/diene copolymer.

10. The composition of claim 9 wherein the oil-soluble olefin-based polymer (a) is an ethylene/α-olefin copolymer, polypropylene, polybutylene, an ethylene-propylene-diene copolymer, a hydrogenated styrene-diene block copolymer, a hydrogenated styrene-diene random block copolymer, or a hydrogenated styrene-diene copolymer.

11. The composition of claim 1 wherein the at least one oil-soluble olefin-based polymer of (a) comprises a mixture of a polymer of weight average molecular weight less than about 10,000 and polymer (a') of weight average molecular weight greater than about 100,000.

12. The composition of claim 1 wherein the polar polymer of (b) contains basic nitrogen functionality.

13. The composition of claim 12 wherein the polar polymer containing basic nitrogen functionality (b) further contains ester functionality.

14. The composition of claim 12 wherein the polar polymer containing basic nitrogen functionality (b) is a polymer with amine functionality.

15. The composition of claim 14 wherein the polar polymer with amine functionality is the reaction product of a partially or fully esterified maleic anhydride-olefin copolymer with an amine.

16. The composition of claim 15 wherein the amine is an N,N-dihydrocarbylalkanediamine or an N-aminoalkyl nitrogen heterocycle.

17. The composition of claim 16 wherein the amine is N,N-dimethylpropane-1,3-diamine or N-(3-aminopropyl)morpholine.

18. The composition of claim 15 wherein the polar polymer is the reaction product of a partially or fully esterified maleic anhydride-styrene copolymer and an amine.

19. The composition of claim 18 wherein the maleic anhydride-styrene copolymer is substantially a 1:1 molar alternating copolymer.

20. The composition of claim 1 wherein the polar polymer with amine functionality is the reaction product of an alkyl acrylate or methacrylate/unsaturated carboxylic acid copolymer with an amine.

21. The composition of claim 20 wherein the amine is an N,N-dihydrocarbylalkanediamine or an N-aminoalkyl nitrogen heterocycle.

22. The composition of claim 21 wherein the amine is N,N-dimethylpropane-1,3-diamine or N-(3-aminopropyl)morpholine.

23. The composition of claim 14 wherein the polar polymer with amine functionality is a copolymer of an alkyl acrylate or methacrylate and an ethylenically unsaturated monomer containing basic nitrogen functionality.

24. The composition of claim 14 wherein the polar polymer with amine functionality is a copolymer comprising a vinyl alkanoate monomer and an ethylenically unsaturated monomer containing basic nitrogen functionality.

25. The composition of claim 24 wherein the polar polymer with amine functionality is a terpolymer further including a vinyl aromatic monomer moiety.

26. The composition of claim 25 wherein the vinyl aromatic monomer is styrene.

27. The composition of claim 24 wherein the polar polymer with amine functionality is a terpolymer further including an $\alpha,\beta$-unsaturated ester monomer moiety.

28. The composition of claim 1 wherein the hydrocarbyl group of the hydrocarbyl-substituted hydroxyaromatic material contains at least about 30 carbon atoms.

29. The composition of claim 1 wherein the hydrocarbyl group is an alkyl group.

30. The composition of claim 29 wherein the alkyl group has a number average molecular weight of about 400 to about 2000.

31. The composition of claim 1 wherein the hydrocarbyl-substituted hydroxyaromatic material is a hydrocarbylsubstituted phenol.

32. The composition of claim 31 wherein the hydrocarbyl-substituted phenol bears an amino substituent or a second hydroxy substituent.

33. The composition of claim 1 wherein the substituted hydroxyaromatic material is a polybutenylphenol wherein the polybutenyl group has a number average molecular weight of about 500 to about 800.

34. The composition of claim 1 wherein the amount of the substituted hydroxyaromatic material is sufficient to provide improved compatibility between components (a) and (b).

35. The composition of claim 1 wherein components (a) and (b) are present in a weight ratio (a):(b) of about 15:1 to about 1:1.

36. The composition of claim 35 wherein the weight ratio is about 10:1 to about 1.5:1.

37. The composition of claim 36 wherein component (c) is present in an amount equal to about 10 to about 100% by weight of the total of components (a) and (b).

38. The composition of claim 37 wherein component (c) is present in an amount equal to about 25 to about 50% by weight of the total of components (a) and (b).

39. The composition of claim 1 further comprising a minor amount of at least one antioxidant, corrosion inhibitor, or pour point depressant.

40. A lubricant prepared by mixing the composition of claim 4 with an oil of lubricating viscosity.

41. A process for improving the mutual compatibility of
(a) at least one oil-soluble, olefin-based polymer;
(b) at least one oil-soluble polar polymer having nitrogen functionality, wherein the polymers of (a) and (b) in combination in a liquid nonpolar oleophilic medium exhibit incompatibility as evidenced by phase separation comprising the step of combining with a mixture of (a) and (b) in a liquid non-polar oleophilic medium an amount of (c) at least one substituted hydroxyaromatic material, wherein the substitution comprises at least one hydrocarbyl group and contains in total at least about 24 carbon atoms, sufficient to reduce said incompatibility.

* * * * *